United States Patent
Jones et al.

(10) Patent No.: US 6,809,302 B1
(45) Date of Patent: Oct. 26, 2004

(54) BOTTLE WARMING DEVICE

(76) Inventors: Demarch R. Jones, P.O. Box 2333, Patterson, LA (US) 70392; Patrick T. Jones, Sr., P.O. Box 2333, Patterson, LA (US) 70392

(*) Notice: Subject to any disclaimer, the term of this patent is extended or adjusted under 35 U.S.C. 154(b) by 0 days.

(21) Appl. No.: 10/445,345

(22) Filed: May 27, 2003

(51) Int. Cl.⁷ .................................................. H05B 3/00
(52) U.S. Cl. ....................................... 219/521; 392/441
(58) Field of Search ................................. 219/521, 218, 219/386, 428, 430, 432; 222/146.5; 392/441

(56) References Cited

U.S. PATENT DOCUMENTS

| | | |
|---|---|---|
| 2,536,596 A | 1/1951 | Fisher |
| 3,804,076 A | 4/1974 | Fant et al. |
| 3,892,945 A * | 7/1975 | Lerner .......................... 219/437 |
| 5,975,337 A | 11/1999 | Hadley |
| 6,064,044 A | 5/2000 | Jerome |
| D448,236 S | 9/2001 | Murray |
| 6,417,498 B1 * | 7/2002 | Shields et al. .............. 219/521 |

* cited by examiner

*Primary Examiner*—Thor Campbell

(57) ABSTRACT

A bottle warming device for allowing a user to warm multiple bottles concurrently. The bottle warming device includes a housing assembly including a housing having top, bottom, front, and side walls, and also having bottle-receiving openings being disposed through the top wall; and also includes an assembly of heating bottles being removably disposed in the bottle-receiving openings.

8 Claims, 6 Drawing Sheets

US 6,809,302 B1

BOTTLE WARMING DEVICE

BACKGROUND OF THE INVENTION

1. Field of the Invention

The present invention relates to bottle warmers and more particularly pertains to a new bottle warming device for allowing a user to warm multiple bottles concurrently.

2. Description of the Prior Art

The use of bottle warmers is known in the prior art. More specifically, bottle warmers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 3,892,945; U.S. Pat. No. 5,975,337; U.S. Pat. No. 6,064,044; U.S. Pat. No. 2,536,596; U.S. Pat. No. 3,804,076; and U.S. Pat. No. Des. 448,236.

While these devices fulfill their respective, particular objectives and requirements, the aforementioned patents do not disclose a new bottle warming device. The prior art includes housings having heating elements for heating bottles.

SUMMARY OF THE INVENTION

The general purpose of the present invention, which will be described subsequently in greater detail, is to provide a new bottle warming device which has many of the advantages of the bottle warmers mentioned heretofore and many novel features that result in a new bottle warming device which is not anticipated, rendered obvious, suggested, or even implied by any of the prior art bottle warmers, either alone or in any combination thereof. The present invention includes a housing assembly including a housing having top, bottom, front, and side walls, and also having bottle-receiving openings being disposed through the top wall; and also includes an assembly of heating bottles being removably disposed in the bottle-receiving openings. None of the prior art includes the combination of the elements of the present invention.

There has thus been outlined, rather broadly, the more important features of the bottle warming device in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new bottle warming device which has many of the advantages of the bottle warmers mentioned heretofore and many novel features that result in a new bottle warming device which is not anticipated, rendered obvious, suggested, or even implied by any of the prior art bottle warmers, either alone or in any combination thereof.

Still another object of the present invention is to provide a new bottle warming device for allowing a user to warm multiple bottles concurrently.

Still yet another object of the present invention is to provide a new bottle warming device that is easy and convenient to set up and use.

Even still another object of the present invention is to provide a new bottle warming device that reduces the amount of time needed to warm up a number of bottles.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
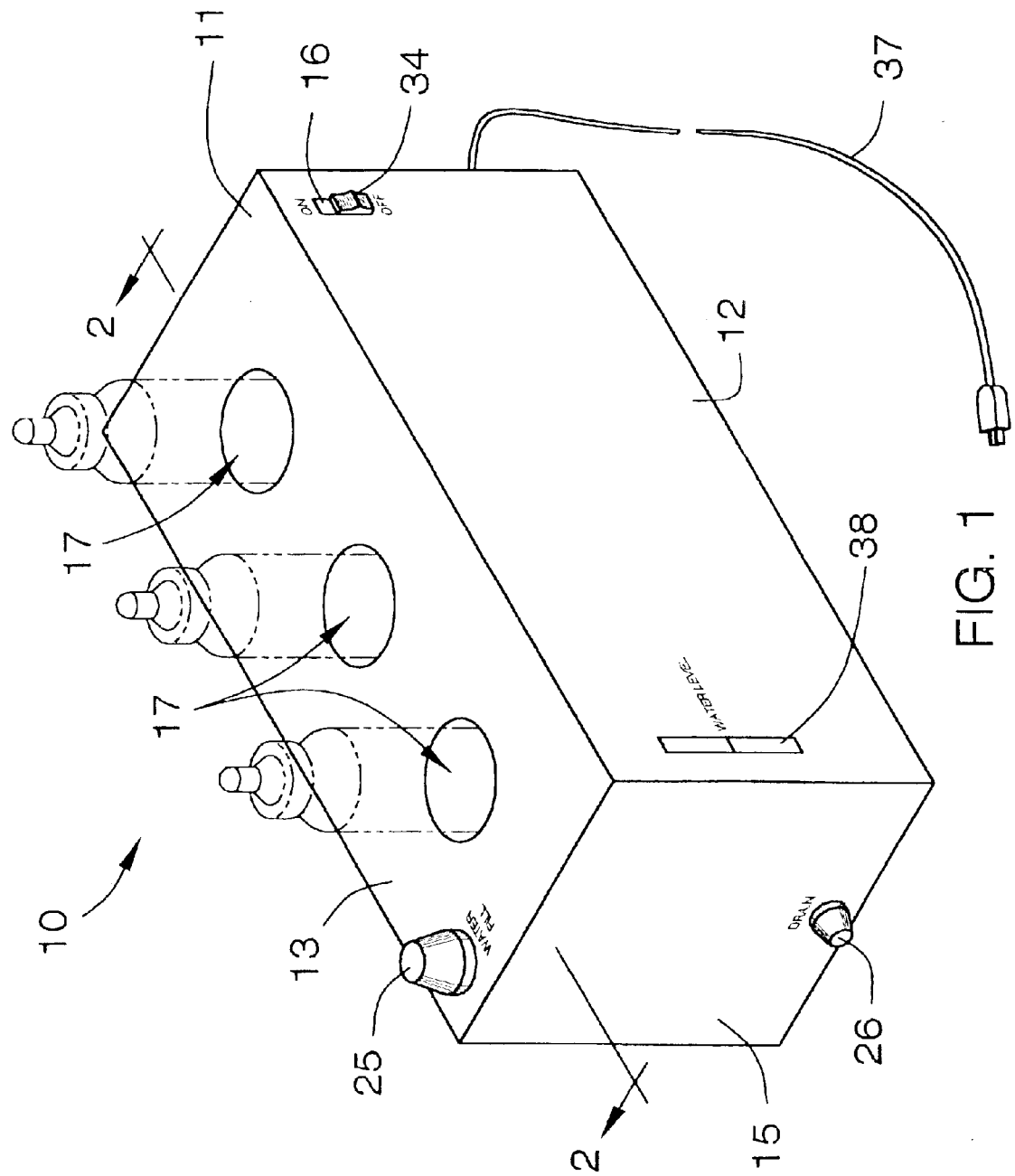
FIG. 1 is a front perspective view of a new bottle warming device according to the present invention.
Figure 2:
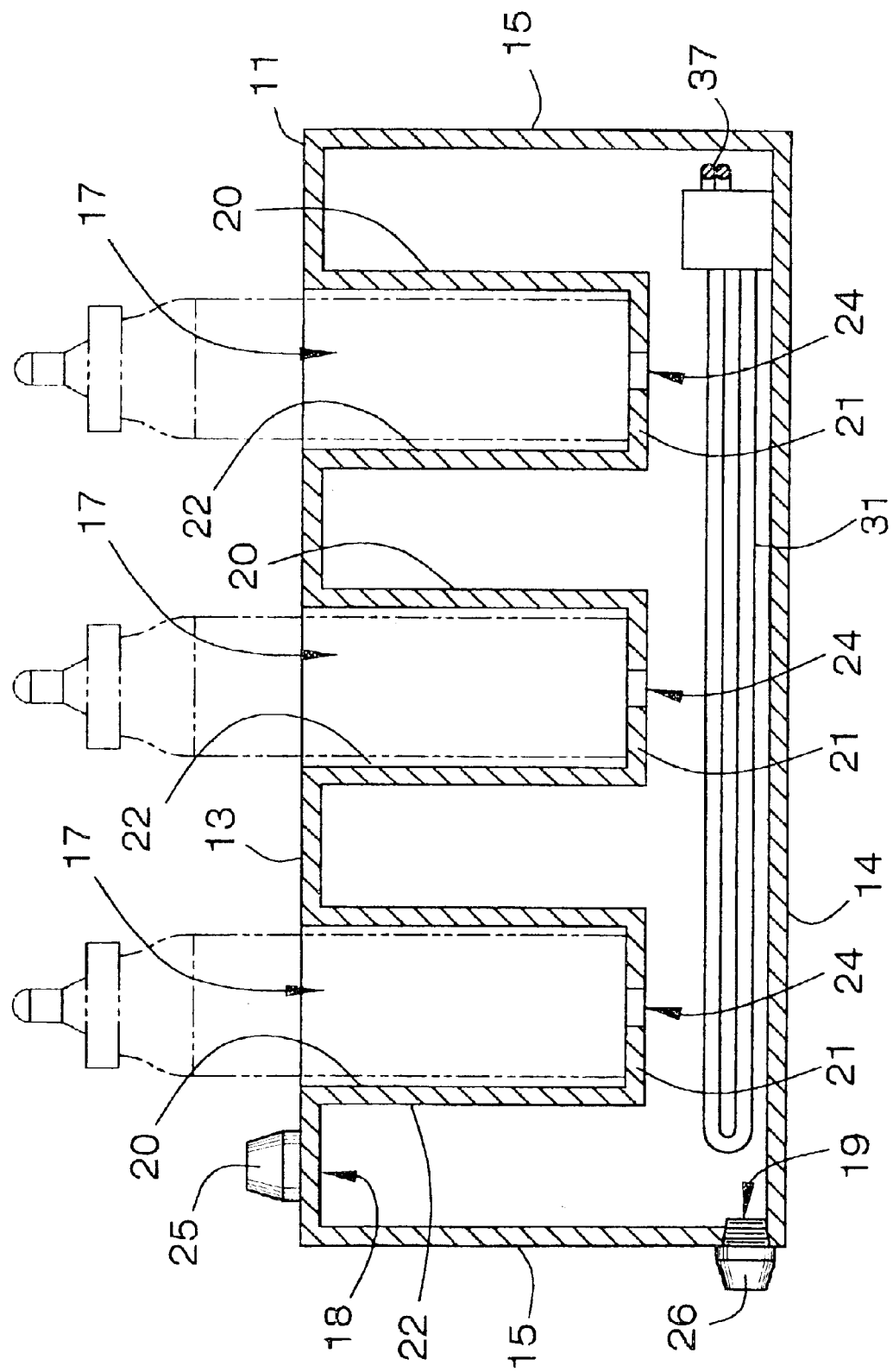
FIG. 2 is a cross-sectional view of the present invention.
Figure 3:
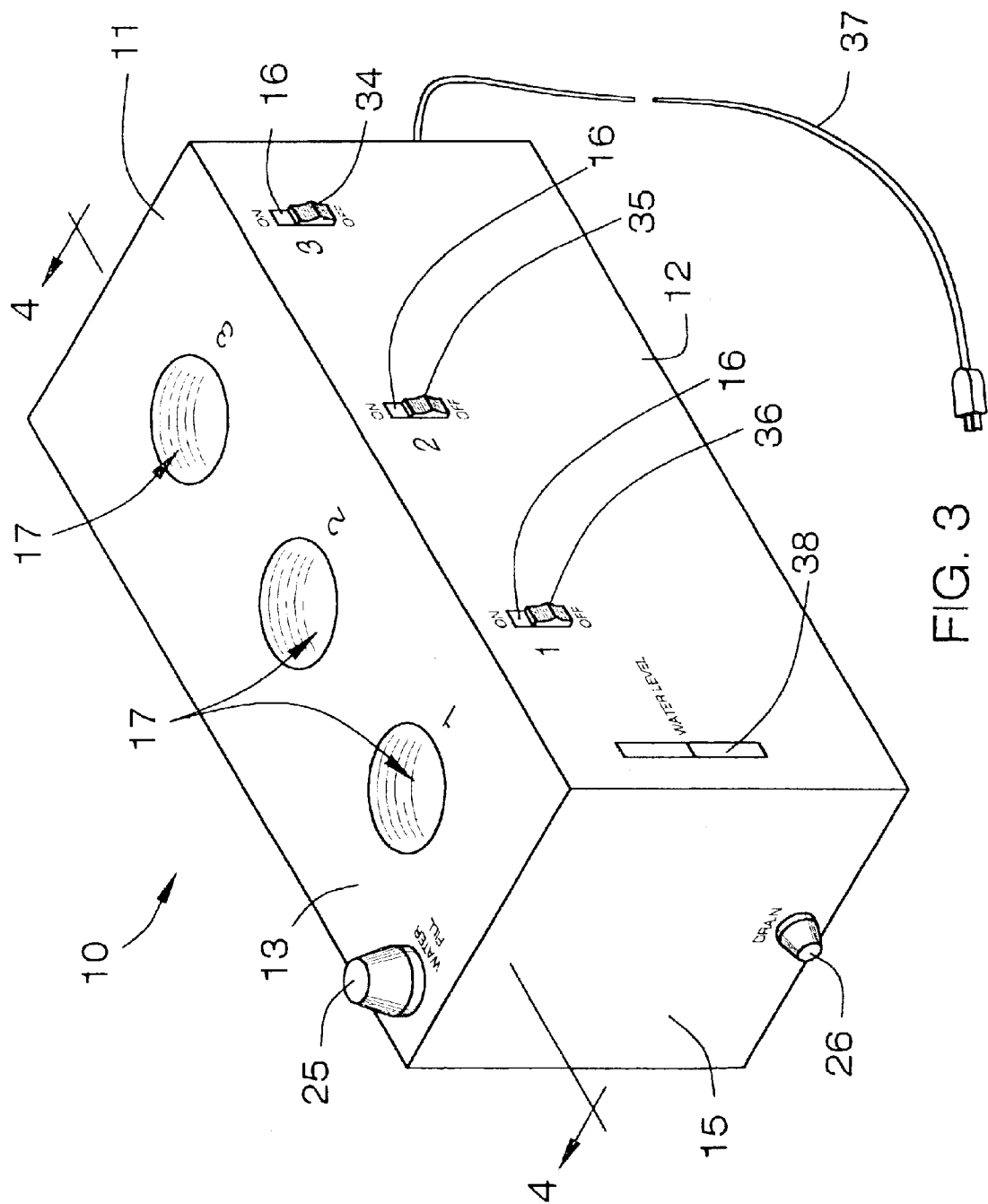
FIG. 3 is a front perspective view of a second embodiment of the present invention.
Figure 4:
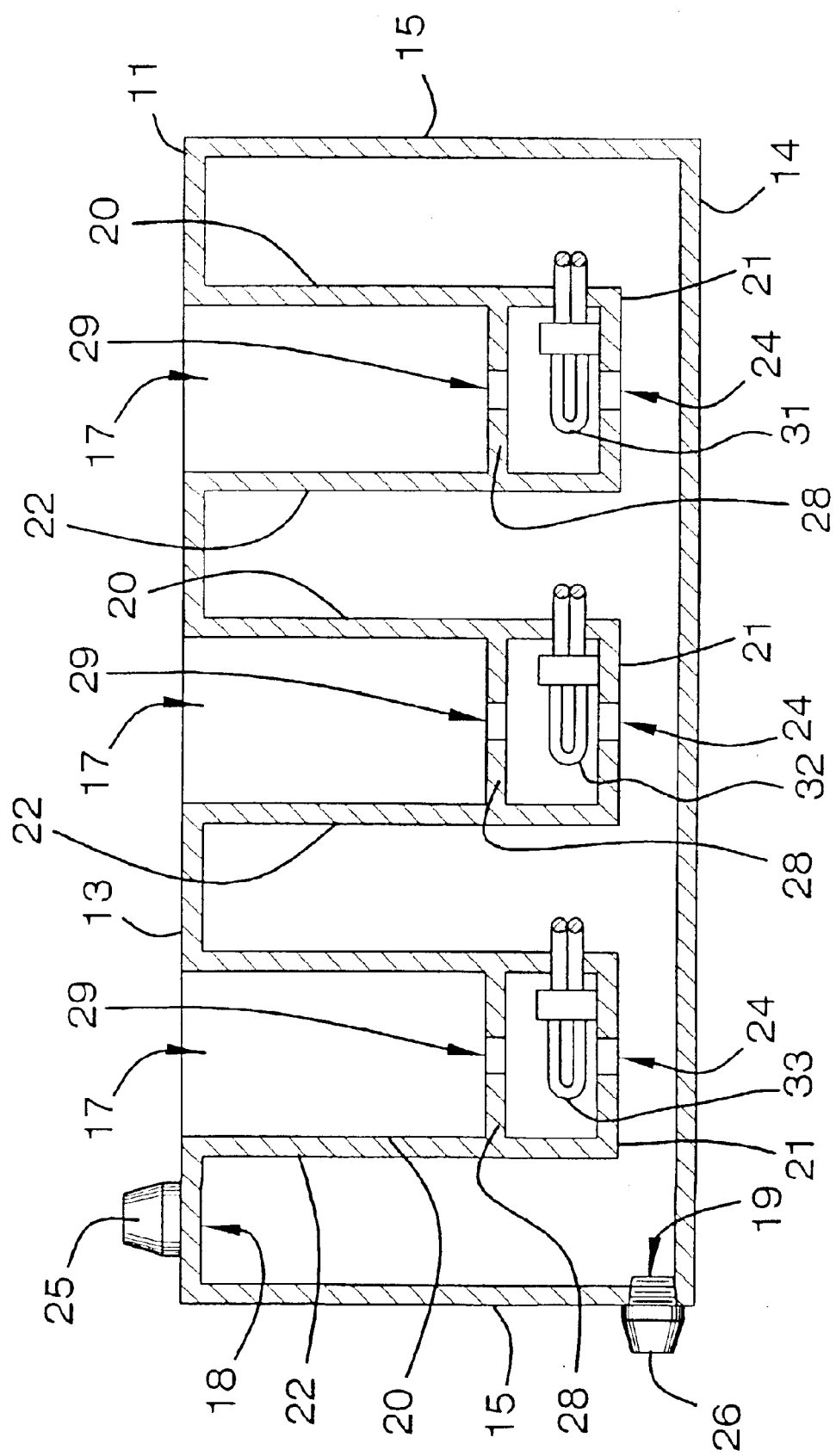
FIG. 4 is a cross-sectional view of the second embodiment of the present invention.
Figure 5:
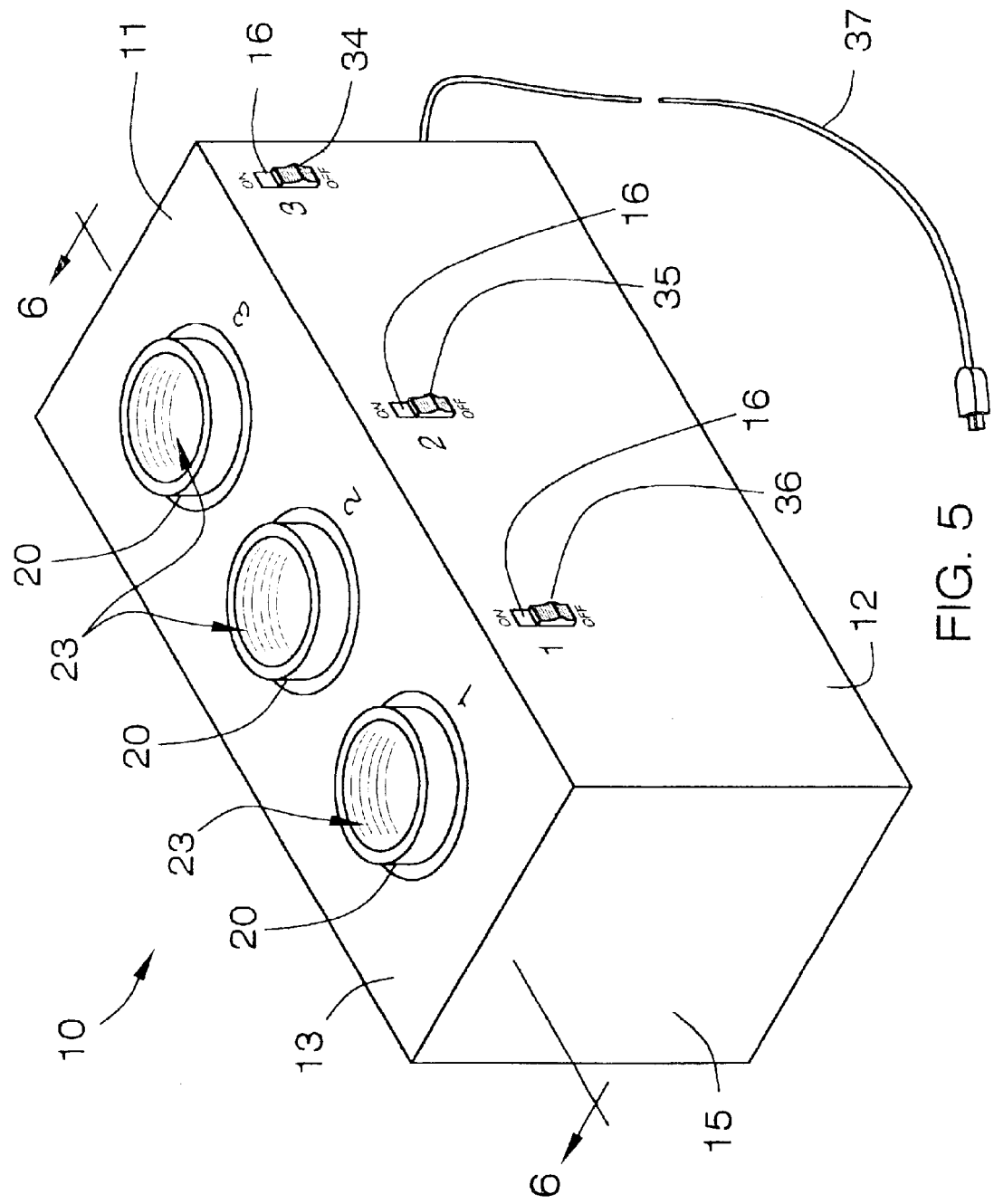
FIG. 5 is a front perspective view of a third embodiment of the present invention.
Figure 6:
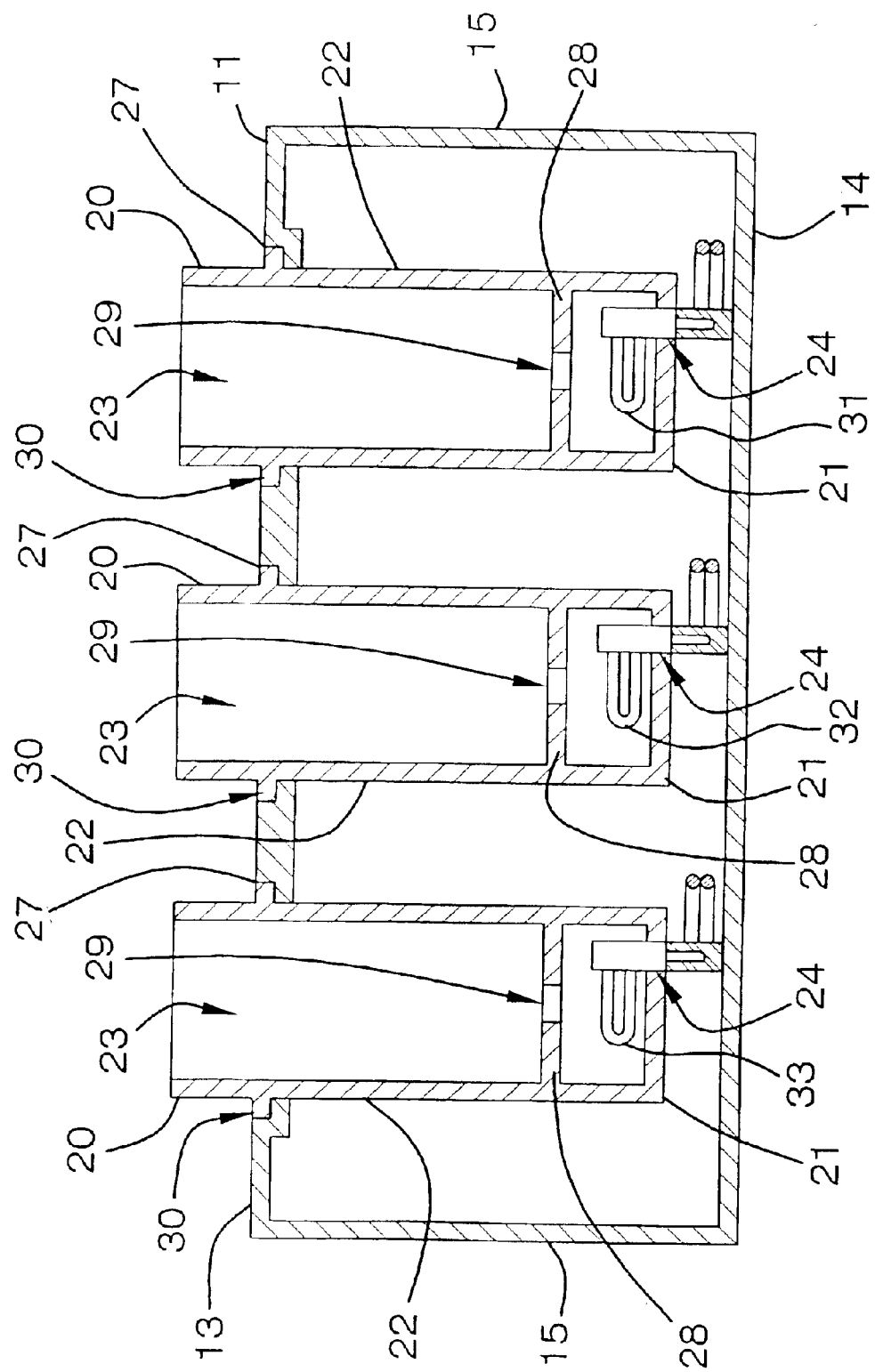
FIG. 6 is a cross-sectional view of the third embodiment of the present invention.

With reference now to the drawings, and in particular to FIGS. 1 through 6 thereof, a new bottle warming device embodying the principles and concepts of the present invention and generally designated by the reference numeral 10 will be described.

As best illustrated in FIGS. 1 through 6, the bottle warming device 10 generally comprises a housing assembly including a housing 11 having top, bottom, front, and side walls 12–15, and also having bottle-receiving openings 16 being disposed through the top wall 13. The housing assembly also includes cylindrical-shaped bottle holders 20 being conventionally disposed in the bottle-receiving openings 16, and having side and bottom walls 21,22 and an open top 23, and also having top edges being securely and conventionally attached to edges forming the bottle-receiving openings 16 in the housing 11 with the bottom walls 21 of the cylindrical-shaped bottle holders 20 being spaced above the bottom wall 14 of the housing 11 and with each bottom wall 21 having a centrally-disposed opening 24 being disposed therethrough to allow water to enter the cylindrical-shaped bottle holder 20. The housing 11 also includes a water fill inlet 18 being disposed through the top wall 13 of the housing 11, and further includes a drainage outlet 19 being disposed through one of the side walls 15 and near the bottom wall 14 of the housing 11, and also includes a water level window 38 being conventionally disposed in the front wall 12 of the housing 11. The housing assembly also includes a cap member 25 being removably and conventionally disposed upon the water fill inlet 18 of the housing 11, and further includes a drainage plug 26 being removably and conventionally disposed over the drainage outlet 19.

A means of heating bottles being removably disposed in the bottle-receiving openings 17 includes a heating element 31 being conventionally disposed in the housing 11 between the bottom walls 21 of the cylindrical-shaped bottle holders 20 and the bottom wall 14 of the housing 11, and also includes a switch 34 being movably and conventionally disposed in a slot 16 in the front wall 12 of the housing 11 and being conventionally connected to the heating element 31, and further includes a power cord 37 being conventionally connected to the switch 34 for the energizing of the heating element 31.

Other embodiments include each of the cylindrical-shaped bottle holders 20 having an intermediate wall 28 being spaced above the bottom wall 21 of a respective cylindrical-shaped bottle holder 20 and having a centrally-disposed hole 29 being disposed therethrough to allow water to flow about a bottle being supported in the cylindrical-shaped bottle holder 20. In addition, the means of heating bottles includes a plurality of heating elements 31–33 each being conventionally disposed in a respective cylindrical-shaped bottler holder 20 between the intermediate wall 27 and the bottom wall 21 of the cylindrical-shaped bottle holder 20, and also includes switches 34–36 being movably and conventionally disposed in the slots 16 in the front wall 12 of the housing 11 and being conventionally connected to the plurality of heating elements 31–33 for individually energizing the heating elements 31–33, and further includes the power cord 37 being conventionally connected to the switches 34–36 for the energizing of the heating elements 31–33.

As another embodiment, the housing 11 further includes annular recessed portions 30 being disposed along the edges of the bottle-receiving openings 17. The cylindrical-shaped bottle holders 20 are removably disposed in the bottle-receiving openings 17 of the housing 11. Each of the cylindrical-shaped bottle holders 20 has an annular flange 27 being conventionally and integrally attached about an exterior of the side wall 22 thereof and being spaced below the top edge thereof and being removably received upon a respective one of the annular recessed portions 30 of the housing 11 for supporting the cylindrical-shaped bottle holder 20.

In use, the user would fill the housing 11 with water through the water fill inlet 18, and would turn on the one or more switches 34–36 which energizes the one or more heating elements 31–33 to heat the water in the housing 11, and would place one or more of the bottles in the cylindrical-shaped bottle holders 20 with the water heating the fluids contained in the one or more bottles.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the bottle warming device. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:
1. A bottle warming device comprising:
   a housing assembly including a housing having top, bottom, front, and side walls, and also having bottle-receiving openings being disposed through said top wall, said housing including cylindrical-shaped bottle holders being disposed in said bottle-receiving openings, and having side and bottom walls and an open top, and also having top edges being securely attached to edges forming said bottle-receiving openings in said housing, said bottom walls of said cylindrical-shaped bottle holders being spaced above said bottom wall of said housing and each having a centrally-disposed opening being disposed therethrough to allow water to enter said cylindrical-shaped bottle holder; and
   a means of heating bottles being removably disposed in said bottle-receiving openings.

2. The bottle warming device as described in claim 1, wherein said housing also includes a water fill port being disposed through said top wall of said housing, and further includes a drainage port being disposed through one of said side walls and near said bottom wall of said housing, and also includes a water level window being disposed in said front wall of said housing.

3. The bottle warming device as described in claim 2, wherein said housing assembly also includes a cap member being removably disposed upon said water fill port of said housing, and further includes a drainage plug being removably disposed over said drainage port.

4. The bottle warming device as described in claim 3, wherein said means of heating bottles includes a heating element being disposed in said housing between said bottom walls of said cylindrical-shaped bottle holders and said bottom wall of said housing, and also includes a switch being movably disposed in said front wall of said housing and being connected to said heating element, and further includes a power cord being connected to said switch for the energizing of said heating element.

5. The bottle warming device as described in claim 3, wherein each of said cylindrical-shaped bottle holders has an intermediate wall being spaced above said bottom wall of a respective said cylindrical-shaped bottle holder and having a centrally-disposed hole being disposed therethrough to allow water to flow about a bottle being supported in said cylindrical-shaped bottle holder.

6. The bottle warming device as described in claim 5, wherein said means of heating bottles includes a plurality of heating elements each being disposed in a respective said cylindrical-shaped bottler holder between said intermediate wall and said bottom wall of said cylindrical-shaped bottle bolder, and also includes switches being movably disposed in said front wall of said housing and being connected to said plurality of heating elements for individually energizing said heating elements, and further includes a power cord being connected to said switches for the energizing of said heating elements.

7. The bottle warming device as described in claim 6, wherein said housing further includes annular recessed portions being disposed along said edges of said bottle-receiving openings.

8. The bottle warming device as described in claim 7, wherein said cylindrical-shaped bottle holders are removably disposed in said bottle-receiving openings of said housing, each of said cylindrical-shaped bottle holders having an annular flange being attached about an exterior of said side wall thereof and being spaced below said top edge thereof and being removably received upon a respective one of said annular recessed portions of said housing for supporting said cylindrical-shaped bottle holder.

* * * * *